Dec. 25, 1928.

A. D. SKINNER 1,696,868

VALVE

Filed Nov. 24, 1922 2 Sheets-Sheet 1

Inventor
Allan D. Skinner

Attorney

Dec. 25, 1928.
A. D. SKINNER
VALVE
Filed Nov. 24, 1922
1,696,868
2 Sheets-Sheet 2
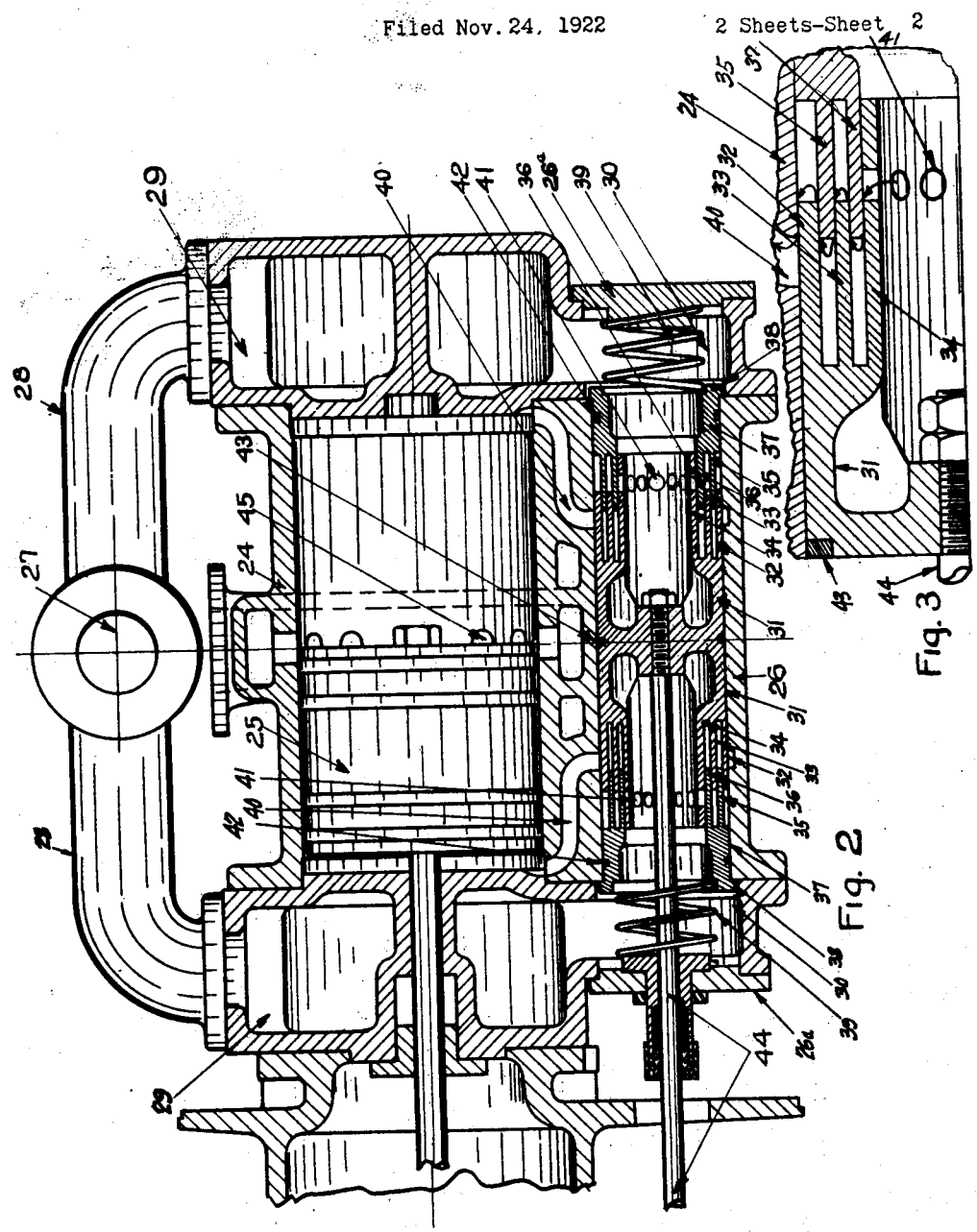

Patented Dec. 25, 1928.

1,696,868

UNITED STATES PATENT OFFICE.

ALLAN D. SKINNER, OF ERIE, PENNSYLVANIA, ASSIGNOR TO SKINNER ENGINE COMPANY, OF ERIE, PENNSYLVANIA, A CORPORATION OF PENNSYLVANIA.

VALVE.

Application filed November 24, 1922. Serial No. 602,982.

The valve is of particular advantage in connection with fluid-actuated motors such as steam engines and is so exemplified in the drawings and following specification. Steam engines as at present constructed are ordinarily supplied with either piston valves, pressure plate valves, or poppet valves. It is difficult to keep these valves tight particularly the piston and pressure plate valves and the poppet valves are difficult to design and keep in working order and are subject to variations due to the differences in temperature of different pressures. Unless great care is taken there is more or less noise connected with the action of the poppet valve and in addition special valve gear must be provided and the construction also necessitates in practical construction a speed limit of the engine.

With the present invention I utilize a plurality of cylindrical shaped telescoping valve elements thus increasing the overlapping surfaces through which any leakage may pass and in consequence reduce the leakage to a minimum. At the same time the structure is one that is simple to construct, requires no special valve gear, and is not limited as to speed.

The invention is illustrated in the accompanying drawings as follows:—

Fig. 2 shows a similar view of a unaflow engine provided with a central exhaust only.

Figure 1:
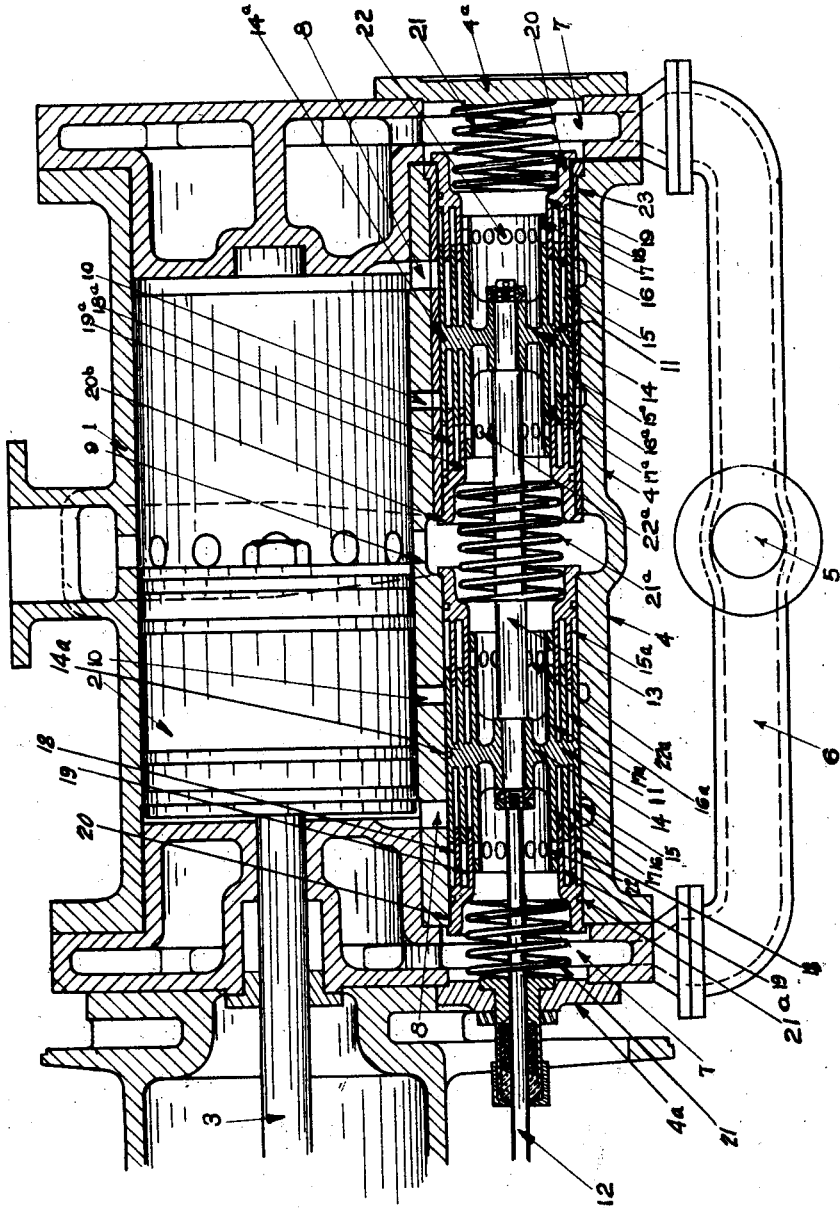
Fig. 1 shows a central section of a unaflow steam engine provided with a valve in accordance with my invention, the engine in this construction having an auxiliary exhaust.

Fig. 3 an enlarged view of the overlapping portions of the valve.

1 marks the cylinder, 2 the piston, 3 the piston rod, 4 the steam chest, 5 the steam supply pipe, 6 a manifold or branch pipe leading from the steam pipe to the steam chambers 7 at the end of the steam chest, 8 inlet ports leading from the steam chest to the cylinder, 9 the central exhaust ports controlled by the piston in the manner common to unaflow engines and 10 auxiliary exhaust ports provided for reducing the compression and operating in the manner common to such ports in unaflow engines.

The valves are made in pairs one for each end of the cylinder and each valve has a body 11 to which is secured a valve rod 12 which may be connected with any actuating mechanism from the crank shaft. The two valves are connected with an extension to the valve rod 13 which extends between them and ties the two valves together and with the valve rod 12. The valve body has a central web 14 from which project the cylindrical valve members 15, 16 and 17, these being concentric and slightly spaced apart. These cooperate with the seat members 18 and 19 carried by a seating bushing 20, the seat members 18 and 19 passing between the surfaces of the valve members 15 and 16 and 16 and 17 respectively and forming as close a fit as is practical with proper running clearance. The bushing 20 is provided with a shoulder at its end which engages the end of the valve chest and is held in position with said shoulder in place by means of a spring 21 which is tensioned between the bushing and a chest cover 4ª. The valve element 17 is longer than the elements 15 and 16 and is sufficiently long with relation to the valve travel to maintain and overlap throughout the travel with the seat member 19 and makes a working fit with the surface of the member 19. It is provided with the ports 22, one side of the port corresponding with the ends of the valve elements 15 and 16, so that as the members 15 and 16 clear the members 18 and 19 the ports 22 also clear the end of the member 19 and thus open the valve. It will be noted that the ends of the members 18 and 19 are in alinement with the outer edge of the port 8 so that as the valve element members separate from the seat members the port 8 is also uncovered and steam is permitted to enter. The web 14 is provided with a packing ring 14ª preventing a leakage of steam from the steam side to the exhaust side of the valve and the bushing 20 is provided with a ring 20ª preventing the leakage of steam past this bushing. These rings, it will be noted, do not pass over any port and in consequence there is an even wearing surface presented to the ring throughout the full circumference of the ring and the ring can, therefore, be readily maintained in a steam-tight condition.

By observing Fig. 3 which illustrates the overlapping portions of the valve it will be noted that the arrows here show the course which a leakage of steam must take and indicates the overlapping closure surfaces which must be passed, if any leakage is effected. Each surface wire-draws the steam so that as a whole the leakage is practically prevented. Further as the members telescope or pass into the pockets formed between the opposing members a certain amount of steam is trapped therein and consequently a back-pressure is formed in these pockets which in practice tends to prevent the leakage of live steam through these pockets.

The bushing 20 is yieldingly mounted through the use of the spring to provide against injury should water be carried into the pockets formed by the valve and seat members. Should water be trapped in these pockets the movement of the valve is accomplished through the yielding of the bushing which permits of the valve completing its motion. As soon as the water is disposed of the spring returns the bushing to its seat, where it remains in its normal position.

The exhaust valve members 15$^a$, 16$^a$ and 17$^a$ telescope exhaust seat members 18$^a$ and 19$^a$ extending from a bushing 20$^b$. The member 17$^a$ is formed somewhat longer than the elements 15$^a$ and 16$^a$ as on the steam side of the valve and is provided with the ports 22$^a$ in the same manner and for the same purpose. These ports operate in the same manner in controlling the port 10 as the live steam side of the valve and the valve gear is so timed as to open and close the auxiliary port 10 in proper relation to the piston and in proper relation to the steam admitted at the opposite end of the piston. The bushings 20$^b$ for the two sets of valves are opposed to each other and are held to their seat by the spring 21$^a$ in the same manner as the bushings at the steam ends of the valve chest are held in place by the springs 21.

In order to readily assemble the valve one end of the valve chest is provided with a liner 23 which is ported to correspond with the ports at that end of the valve chest. This permits of the assembling of the bushing 20$^b$ at the opposite end of the chest, the bushing 20$^b$ mounted in the liner being carried into place as the liner is inserted.

In the alternative construction shown in Fig. 2, 24 marks the cylinder, 25 the piston, 26 the steam chest, 27 the steam inlet, and 28 the branch pipes carrying the steam to the steam heated heads 29 of the cylinder from which it passes to the steam chamber 30 of the steam chest. The valve has a valve body 31 with the valve members 32, 33 and 34 at each end. These valve members operate in conjunction with the seat members 35 and 36 arranged on a seat bushing 37, the seat bushing having a shoulder 38 engaging the ends of the steam chest. The bushing is yieldingly held in place by a spring 39. Steam ports 40 extend from the steam chest to the ends of the cylinder and in position to be uncovered and closed by the valve as the valve is operated by a valve rod 44. The valve member 34 is elongated so as to maintain its overlap with the valve member 36 and is provided with ports 41 which are uncovered as the valve members 32 and 33 move past the ends of the bushing members 35 and 36. The bushing is provided with a ring 42 making it steam-tight and the valve with a ring 43 making it steam-tight.

The operation of this valve will be readily understood from the description of the structure shown in Fig. 1, the engine taking the steam through the ports 40 and completing the exhaust through the exhaust ports 45.

What I claim as new is:—

1. In a fluid actuated engine, the combination of a cylinder having an inlet and exhaust port; a double-ended valve acting on said ports, one end controlling the steam port and the other the exhaust port and each comprising a valve member and a seating member, each of said members having a plurality of cylindrical rings telescoping a plurality of cylindrical rings on the other member, the sliding surfaces of the telescoping rings forming a closure for the valve; and yielding mountings for the seating members.

2. In a fluid-actuated engine, the combination of a cylinder having an inlet port at each end and exhaust ports for each end of the cylinder; two double-ended valves controlling said ports, each valve being double-ended and each end of each valve comprising a valve member and a seating member, each of said members having a plurality of cylindrical rings telescoping a plurality of cylindrical rings on the other member, the sliding surfaces of the telescoping rings forming a closure for the valve; and yielding mountings for the seating members.

In testimony whereof I have hereunto set my hand.

ALLAN D. SKINNER.